United States Patent [19]
Lancaster

[11] Patent Number: 5,605,567
[45] Date of Patent: Feb. 25, 1997

[54] METHOD OF PRODUCING CELLULOSE DOPE

[75] Inventor: E. Peter Lancaster, Gig Harbor, Wash.

[73] Assignee: Weyerhaueser Company, Federal Way, Wash.

[21] Appl. No.: 428,315

[22] Filed: Apr. 24, 1995

Related U.S. Application Data

[63] Continuation of Ser. No. 222,727, Apr. 4, 1994, abandoned, which is a continuation of Ser. No. 804,241, Dec. 5, 1991, abandoned.

[51] Int. Cl.$^6$ ............................ C08L 1/02; C09D 101/02
[52] U.S. Cl. ............................ 106/163.01; 106/166.01
[58] Field of Search .......................... 106/163.1, 164, 106/165, 203

[56] References Cited

U.S. PATENT DOCUMENTS

| | | | |
|---|---|---|---|
| 3,533,567 | 10/1970 | Willems | 241/163 |
| 4,634,470 | 1/1987 | Kamide et al. | 106/203 |

Primary Examiner—David Brunsman
Attorney, Agent, or Firm—Klarquist Sparkman Campbell Leigh & Whinston

[57] ABSTRACT

A cellulose dope prepared by subjecting a slurry of cellulose to cavitation either before, during or after treatment with a solvent. The cavitation results in the efficient fibrillization or delamination of the pulp fibers by peeling back the layers of fiber. The cavitation makes the fibers highly accessible to solvents for dissolution. One preferred cellulose solvent is sodium hydroxide at soda cellulose Q condition.

19 Claims, 6 Drawing Sheets

METHOD OF PRODUCING CELLULOSE DOPE

CROSS REFERENCE TO RELATED APPLICATIONS

This is a continuation of application Ser. No. 08/222,727, filed Apr. 4, 1994, now abandoned, which is a file wrapper continuing application of Ser. No. 07/804,241, filed on Dec. 5, 1991, now abandoned.

TECHNICAL FIELD

The present invention relates to processes for the preparation of a dissolved cellulose feed stock.

BACKGROUND INFORMATION OF THE INVENTION

Cellulose is widely used as a raw material for the production of articles such as rayon and cellophane. Most commercial methods for processing cellulose involve exposing the raw cellulose to an aqueous alkali solution, then adding complexing agents to produce a dope. The dope is then subjected to various processing steps to regenerate cellulose. The cellulose produced by these methods is known as regenerated cellulose because the cellulose molecule is dissolved by the production of specific coordination complexes with the dissolving solvent. For example, according to one method the raw cellulose is first steeped in sodium hydroxide. Carbon disulfide is added to the resulting alkali cellulose crumb under specific conditions, resulting in the formation of sodium cellulose xanthanate. The coordination complex is then converted into the regenerated cellulose. In this process, the intramolecular hydrogen bonding in the cellulose is disrupted through the formation of coordination complexes between the alkali and the glucose of the cellulose.

Two common methods for the production of regenerated cellulose are the viscose method and the cuprammonium method. Each of these methods utilizes a step-wise chemical process wherein cellulose is dissolved into solution by converting it into a cellulose derivative. The resulting dope containing the cellulose derivative is then processed into regenerated cellulose derivative products by, for example, wet spinning, extrusion and coagulation.

These methods have been successfully used for the production of regenerated cellulose on a commercial scale for many years. However, each method utilizes expensive materials, and each produces certain toxic by-products. Thus, there exist environmental and economic concerns inherent with each method. In addition, because the glucose moieties of regenerated cellulose produced by either the viscose method or the cuprammonium method exists as a coordination complex, the degree of polymerization of the molecule is reduced. In other words, as the number of coordination complexes in the regenerated cellulose increases, the intramolecular hydrogen bond forming sites on the cellulose molecules decrease. This generally decreases the commercial desirability of the resulting product because an increased number of intramolecular hydrogen bonding sites generally produces higher quality finished products.

Other methods for dissolving cellulose for the production of shaped articles are well known. One such method is through the use of organic solvents such as $N_2O_4$/DMF (dinitrogen tetroxide/dimethylforamide), DMSO/PF (dimethyl sulfoxide/paraformaldehyde), and TFA/CA (trifluoroacetic acid/chlorinated alkanes). Methods utilizing these organic solvents are generally not used on a commercial basis because of their complexity and prohibitive cost. In addition, these methods use toxic components which pose environmental hazards.

Various metal complexes also may be utilized to dissolve cellulose. For example, LiCl/DMA (lithium chloride/dimethylacetimide), Cadoxene (cadmium/ethylene diamine), Coxene (cobalt/ethylene diamine), and CUEN (cupriethylenediamine) have been used. Like organic solvents, these compounds are generally not used on a commercial basis for the production of regenerated cellulose because the chemical components are expensive and contain toxic materials, such as heavy metals and amines.

Shaped products such as rayon and cellophane may also be produced without dissolving the cellulose into solution as a coordination complex. One process for dissolving cellulose without production of an intermediate coordination complex is disclosed in U.S. Pat. No. 4,634,470 to Kamide et al. Kamide teaches a method whereby the raw cellulose molecules are cleaved by disruption of the intramolecular hydrogen bonding, but without the intermediate step of forming coordination complexes. In one approach described in Kamide, a mixture of 100 parts by weight of cellulose and 10 to 1000 parts by weight of hydrogen cleaving solution, such as aqueous solutions of alkali or organic acids, is held at a temperature between 100° C. to 350° C., under a pressure between 10 to 250 atmospheres. The pressurized mixture is abruptly discharged into ambient atmospheric pressure, which causes a rapid volatilization of the hydrogen bond cleaving agent. This volatilization in turn disrupts the intramolecular hydrogen bonds, causing dissociation of the cellulose molecule. The resulting fibers from this steam explosion process are fragmented. That is, the abrupt discharge results in the shortening of the cellulose structure which will result in a lower degree of polymerization in the final product. The resulting shortened fibers are then mixed with an alkali solution to dissolve the cellulose to produce a dope which is described as having a degree of polymerization of at least 100. The steam discharge is understood to have limitations on the maximum degree of polymerization attainable. The article *Characterization of Cellulose Treated by the Steam Explosion Method,* Brit. Polymer J. 22 (1990) by Yamashiki, et al., suggests that in the steam explosion process, the degree of polymerization of the initial cellulose fibers had to be reduced substantially in order to obtain satisfactory dissolution of cellulose in a cellulose dope.

Unlike the regenerated cellulose produced by either the viscose method or the cuprammonium method, which as noted utilize cellulose derivatives, the cellulose dope produced according to the steam explosion method described by Kamide requires neither intramolecular hydrogen bonding in the dissociated state nor coordination complexes. As a result, the shaped articles produced from the dope reportedly have improved mechanical properties and chemical resistance. However, as with any high pressure process, safety concerns are present with the Kamide, et al. approach. The Kamide, et al. patent also describes processes involving the regeneration of cellulose produced using, for example, a solvent such as lithium chloride. The regenerated cellulose is then dissolved in an aqueous alkali solution (e.g. NaOH) having a concentration of 6–12 percent by weight at a temperature not higher than 50° C. preferably less than 10° C., and most preferably less than 7° C. This process suffers from the disadvantages previously mentioned in connection with approaches involving the production of a regenerated cellulose.

It is also well known in the art that cellulose swells when exposed to the hydrogen bond cleaving agent sodium hydroxide. Swelling of the cellulose by nearly 1000 percent is achieved upon exposure to sodium hydroxide maintained at soda cellulose Q condition. This is explained in an article by Sobue, et al., entitled "The Cellulose-Sodium Hydroxide-Water System as a Function of Temperature", Z. Physik. Chem. (B)43(3), 1939. Soda cellulose Q condition occurs when cellulose is in an aqueous solution of 6 percent to 10 percent by weight of sodium hydroxide, at a temperature between $-7°$ C. and $4°$ C. The aqueous sodium hydroxide penetrates between the fiber layers. This expands the lattice structure and results in the formation of large, irregular distances therebetween. However, only the amorphous fraction of Cellulose I fibers (e.g. about 20–30 percent) dissolves under these conditions.

Since the late thirties, sonics have been used in the papermaking industry to defiber and fibrillize pulp fiber to achieve a fiber of high quality and strength for use in making paper products. More recently, sonics have been used to disperse high gloss inks and overprint varnishes from recycled paper. After the recycled paper is de-inked, the pulp from the paper is reused in the production of other paper products. However, despite the long-standing availability of this technology, no one has applied this technology to the production of cellulose dope.

Therefore, a need exists for an improved method of producing a cellulose dope.

SUMMARY OF THE INVENTION

In the present invention, it has been discovered that cavitation of a pulp slurry may be used advantageously in the production of cellulose dope. According to the present invention, pulsed energy is applied to a pulp slurry to induce cavitation. The pulsed energy is applied to produce pressure waves in the slurry. A preferred approach is to apply sonic or ultrasonic energy consisting of expansive and compressive waves to cause cavitation within the slurry. Although the invention is not limited to any particular theory of operation, it is believed that the waves cause bubbles of air entrained in the slurry to expand and recompress. This alternating expansion and compression is further believed to cause implosive collapse of the air bubbles, resulting in adiabatic heating up to temperatures in the thousands of degrees, and pressures up to thousands of atmospheres. The implosions of air bubbles are understood to produce powerful shocks waves which impinge on pulp fibers in their path with jet velocities on the order of about 500 m/s and shock pressures of about 5 Kbars. Regardless of the exact mechanism, the cavitation results in the efficient delamination and fibrillation of the pulp fibers by peeling back the layers of fiber. Due to the delaminated nature of the fibers as a result of cavitation, the fibers are highly accessible to solvents for dissolution.

By placing the slurry under pressure, greater amounts of energy must be introduced into the slurry to cause cavitation, due to the increased vapor pressure of gas in a pressurized slurry. When cavitation does occur under these conditions, more energy is released by the imploding bubbles into the slurry, which improves the desired fibrillation/delamination of the cellulose fibers. Also, less time is required for the fibrillation of cellulose fibers to occur.

The delaminated pulp is dissolved into a cellulose dope by treatment with a solvent such as an alkali solvent. Because the fibers are peeled back by the application of pulsed energy and cavitation within the slurry, the cellulose may be efficiently exposed to hydrogen bond cleaving agents or other solvents.

As another aspect of this invention, it has also been discovered that the subjecting of the laminated cellulose to caustic at soda cellulose Q conditions is an extremely effective process for producing a cellulose dope. At cellulose Q condition, maximal dissociation of the hydrogen bonds in the cellulose molecules is achieved. Exposure of the cellulose to sodium hydroxide may be either before, during or after fibrillation by cavitation.

As another aspect of the present invention, the cellulose is slurried and subjected to cavitation and the resulting cellulose is thereafter dissolved in a solvent.

As a further aspect of the present invention, the cellulose is subjected to cavitation while the cellulose is in a slurry with a dissolving agent.

As yet another aspect of the present invention, the cellulose is in a slurry with a dissolving agent and repeatedly subjected to cavitation.

As a further aspect of the present invention, the cellulose may be never-dried cellulose, such as taken directly from a pulp manufacturing line.

According to another specific aspect of the present invention, there is provided a process for the preparation of cellulose dope which comprises subjecting a mixture of 1.5 percent or more by weight of cellulose (either a dried form or directly from a pulp manufacturing process) in an aqueous solution, a hydrogen cleaving agent, the hydrogen cleaving agent being present in an amount which is from 6 percent to 10 percent by weight to the total weight of the slurry (cellulose, cleaving agent and water or other liquid), at a temperature of between $-7°$ C. and $4°$ C., to cavitation to dissolve the cellulose.

According to yet another specific aspect of the present invention, there is provided a process for the preparation of the above mentioned cellulose dope which comprises subjecting a mixture of 1.5 percent or more by weight of cellulose (either a dried form or directly from a pulp manufacturing process) in an aqueous solution to cavitation, mixing the resulting cellulose with a hydrogen cleaving agent, the cleaving agent being present in an amount of from 6 percent to 10 percent by weight to the total weight of the slurry (cellulose, cleaving agent and water or other liquid), and cooling the mixture to a temperature of between $-7°$ C. and $4°$ C., then subjecting the mixture to mixing to dissolve the cellulose, An overall object of the present invention is to provide an improved method for the preparation of cellulose dope.

These and other features, advantages and objects of the present invention will become more apparent with reference to the following description and drawings.

DETAILED DESCRIPTION OF THE PREFERRED EMBODIMENTS

The process of producing cellulose dope of the present invention is different from cellulose produced in the typical industrial setting. For purposes of this description, a cellulose dope is defined as cellulose dissolved in a solvent. The present invention does not require a derivative step in order to dissolve the cellulose, therefore the step of regeneration from a derivative is not necessary in the shaping process. The underivatized cellulose in the dope of the present invention may have a high degree of polymerization, such as above 400, and no limitations have been found to the degree of polymerization of the starting material. Therefore, virtually any type of cellulose may be used in the process of the present invention, including cellulose from hardwood and softwood trees.

Figure 1:
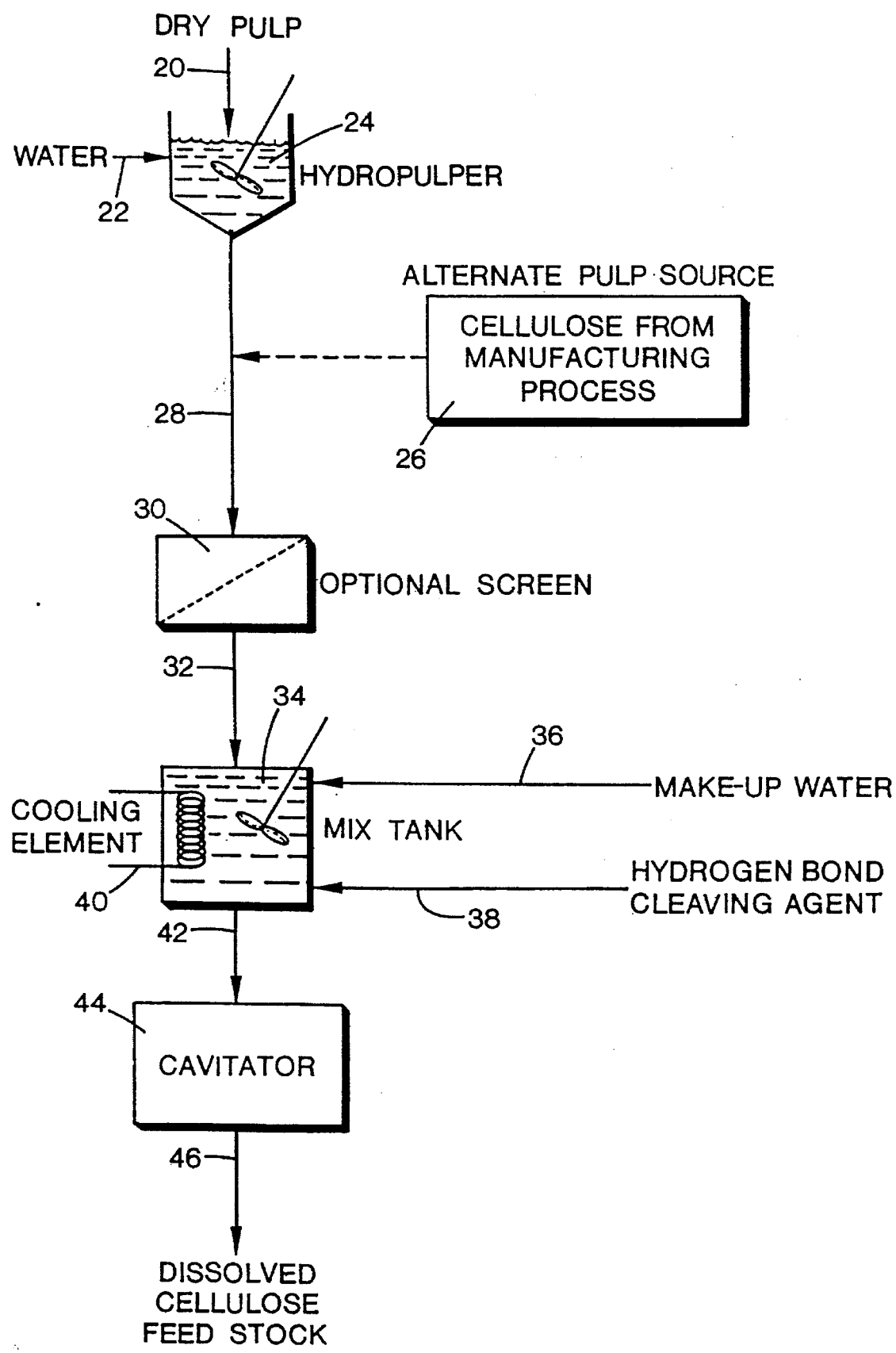
FIG. 1 is a block diagram of a single stage cellulose dope production process in accordance with the present invention.

With reference to FIG. 1, a single stage cellulose dope production process in accordance with the present invention is illustrated. In this embodiment, the dope is produced by exposing a cellulose slurry to a hydrogen bond cleaving agent before the slurry is subjected to pulsed energy to cause cavitation.

More specifically, dry pulp 20 is combined with water 22 in hydropulper 24 to produce a pulp slurry 28. Alternately, the pulp output from a pulp manufacturing process 26 can be used directly as the pulp slurry 28. Because pulp manufacturing plants have facilities in place for treating waste water, by operating the process on the site of a pulp manufacturing plant separate waste water treatment equipment is not needed. The existing waste water equipment can be used for treating both the pulp production and the cellulose dope production waste water. Also, never-dried pulp (which has a high initial degree of polymerization) may be used to enhance the degree of polymerization of the cellulose in solution resulting from the process of the present invention. Of course, other sources of cellulose may be used in addition to pulp. The pulp slurry 28 may be passed through an optional screen 30 to remove shives and foreign material. The screened pulp slurry 32 is placed in mix tank 34 with make-up water 36 and a hydrogen bond cleaving agent 38.

Preferably, the hydrogen bond cleaving agent is an aqueous alkali solution, such as of sodium hydroxide, potassium hydroxide, lithium hydroxide, beryllium hydroxide and cesium hydroxide. Other cellulose solvents may also be used, such as identified in U.S. Pat. No. 4,634,470, which is incorporated by reference herein. However, sodium hydroxide is the most preferred hydrogen bond cleaving agent.

If used, the sodium hydroxide and other alkali cleaving agents are mixed to a concentration of between 6 percent and 10 percent by weight to the total weight of the slurry in a mix tank 34. Make-up water 36 or other liquid is typically added to bring the cellulose concentration to a level in which cavitation is achievable. Preferably, the cellulose is slurried to a sufficient extent to be flowable through the cavitation device used in the process. In general, cellulose from about 5 percent to about 8 percent by weight to the total weight of the cellulose and other slurry components would be considered flowable. However, a lesser cellulose concentration in the slurry, such as about 1.5 percent, is typically easier to process.

To achieve the most preferred soda cellulose Q conditions when sodium hydroxide is being utilized as the hydrogen bond cleaving agent, the contents of the mix tank are cooled using cooling element 40. As noted, soda cellulose Q conditions are achieved when the mix tank contents are cooled to between $-7°$ C. and $4°$ C.

In this specific example, the cold pulp slurry 42, which is at soda cellulose Q condition, is pumped through cavitator 44. In the preferred embodiment, the cavitation is achieved by exposing the slurry to sufficient pulsed energy to cause cavitation. Preferably, the pulsed energy is applied in the form of pressurized waves. Any suitable source of pulsed energy may be used such as electronic signal generators including piezoelectric electronic horns, magneto restrictive systems and mechanical vibrating systems including liquid whistles. Mechanical sonolators such as a Dispersonic System Model 15 BT from Sonic Corporation of Stratford, Conn. or sonic signal generators such as a Model EGR-1600B Power Generator from E.N.I. Power Systems Incorporated of Rochester, N.Y., have proven effective for this purpose.

In the preferred embodiment, energy within the frequency range at which cavitation occurs is applied to the slurry. Cavitation refers to transient cavitation; namely, the generation of and implosion of bubbles in the slurry. Although variable, a preferred frequency range of the pulsed energy is from about 500 Hz to about 1 Mhz and a most preferred frequency is about 20 kHz. One would select a frequency at which effective cavitation occurs for the particular slurry and pressure conditions. Although the energy can be varied, as a specific example, effective delamination of fibers has been observed when the slurry is exposed to energy at 20 kHz of about 250 watts for at least about 8 minutes per gram of slurry. The exact processing parameters depend upon the type of cellulose which is being processed. It appears that hardwood cellulose fibers require either a longer treatment time, a higher energy, or both to cause effective delamination of the fibers.

Figure 6:
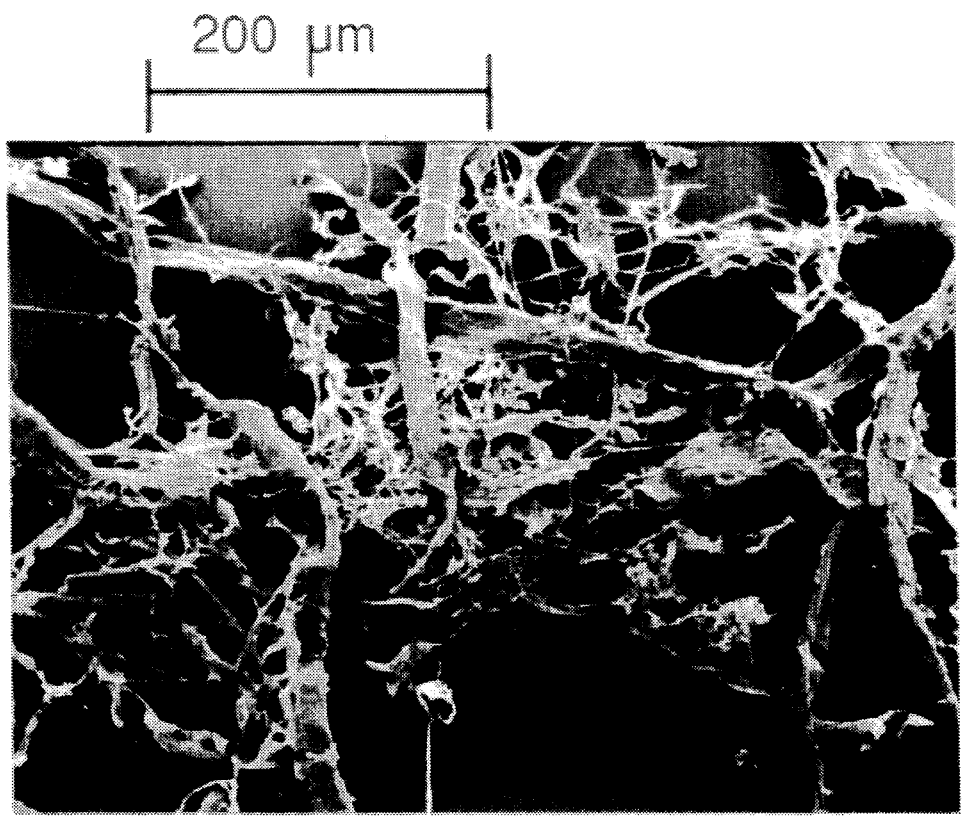
FIG. 6 is a micrograph illustrating the resulting physical appearance of the cellulose fibers after being subjected to cavitation.

The cavitation causes the pulp fibers to peel open, providing effective access of the hydrogen bond cleaving agent 38 (in this case sodium hydroxide) to react with the cellulose structure. The sodium hydroxide cleaves the intramolecular hydrogen bonding in the cellulose molecule, which results in dissolved cellulose feed stock 46. FIG. 6 illustrates the resulting physical appearance of the cellulose fibers after being subjected to cavitation. The fibers are not exploded or fragmented, such as occurs with the steam explosion of U.S. Pat. No. 4,634,470. The explosion technique, in effect, results in chopped, shortened cellulose fibers which, when processed, result in a lower degree of polymerization of the resulting feed stock. During cavitation, the fiber layers tend to be peeled back lengthwise, thereby minimizing the chopping and shortening of the cellulose structure. This facilitates the achieving of a higher degree of polymerization in the resulting feed stock 46. The peeling back of the fiber layers also allows the hydrogen bond cleaving agent a greater surface area to react and dissolve the cellulose fiber.

Although variable somewhat depending upon the original source of cellulose, for wood pulp cellulose preferred soda cellulose Q conditions were found to be a sodium hydroxide concentration of from 6–10 percent by weight sodium hydroxide to the total weight of the slurry and a temperature in the range of from $-7°$ C. to $4°$ C. The most preferred soda cellulose Q conditions are a sodium hydroxide concentration of 9 percent by weight and a temperature between $-4°$ C. and $2°$ C.

Figure 2:
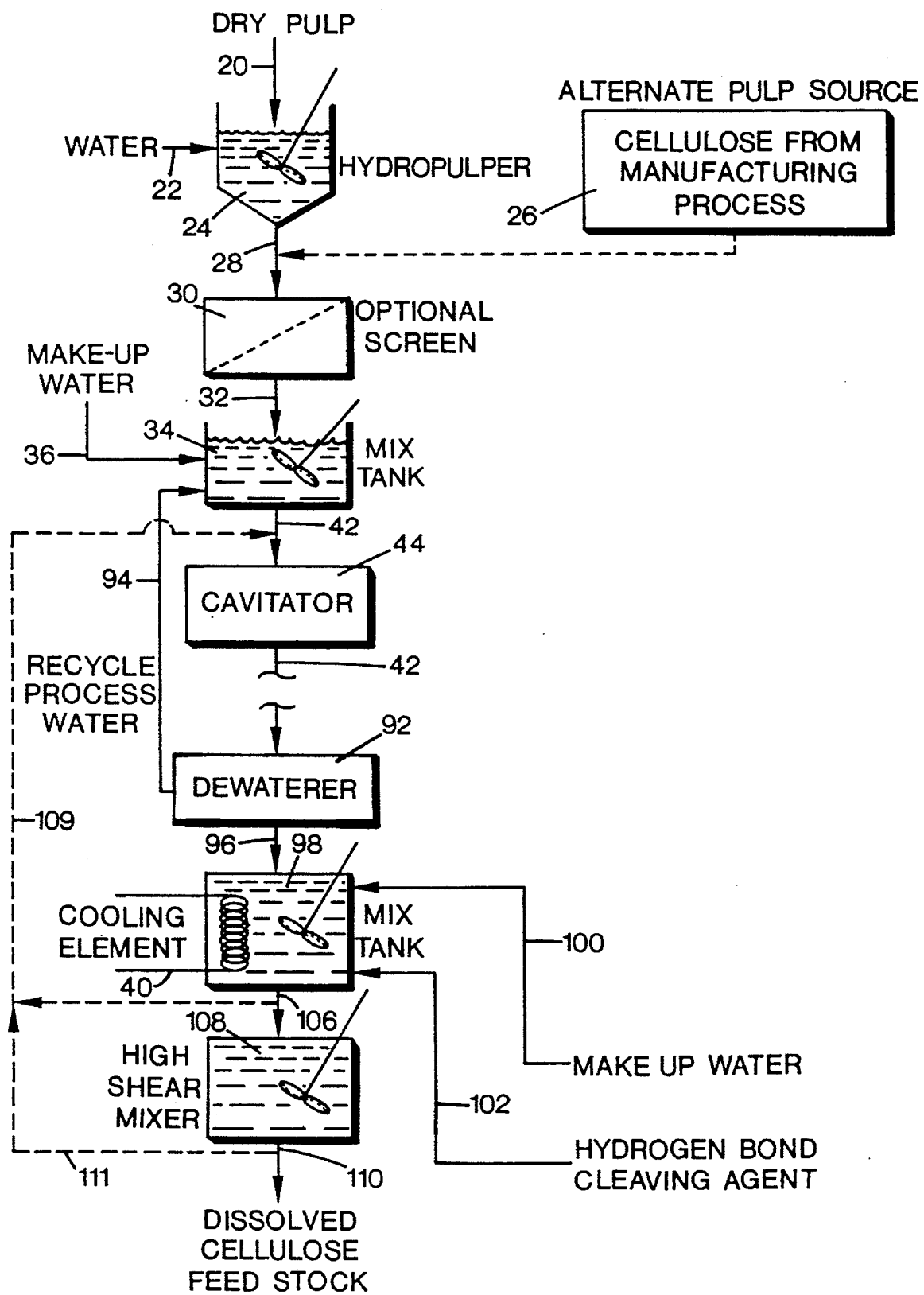
FIG. 2 is a block diagram of a two stage cellulose dope production process, wherein cavitation of the cellulose slurry occurs prior to its exposure to hydrogen bond cleaving agent.

FIG. 2 illustrates an embodiment of the invention utilizing a two stage cellulose dope production process, wherein the pulp slurry is subjected to cavitation prior to its being combined with an hydrogen bond cleaving agent. In this embodiment, elements in common with the embodiment of FIG. 1 have been assigned like numbers and will not be discussed in detail.

In this embodiment, the mixed slurry on line 42 is pumped into cavitator 40 wherein the cavitation process again results in the fibrillization of the pulp fibers.

The slurry 82 is then passed through a dewaterer 92 at which the recycle process water 94 is recycled into mix tank 74. The dewatered pulp 96 is sent to mix tank 98. By dewatering the pulp and recycling the process water, liquid utilized in the cavitation operation is separated from liquid containing the cellulose solvent. However, the dewatering step may be eliminated, in which case the solvent is added to the slurried cellulose either before, during or after the cavitation step 44. In mix tank 98, like tank 34 described above, the dewatered pulp 96 is mixed with make-up water 100 and hydrogen bond cleaving agent 102, such as sodium hydroxide. The concentration of sodium hydroxide in mix tank 34 is again preferably maintained between around 6 percent and 10 percent by weight to the total weight of the slurry. Make-up water 100 is added to bring the cellulose concentration to the desired level, such as at least 1.5 percent by weight. The contents of the mix tank are cooled to achieve soda cellulose Q conditions using cooling element 104. When the hydrogen bond cleaving agent is sodium hydroxide, the mix tank contents are preferably cooled to between about −7° C. and 4° C., thereby achieving soda cellulose Q conditions.

The cold pulp slurry 106 is pumped into a high shear mixer 108, such as a Henschel Miyer Type FM-10C from Pernell International of Houston, Tex. This facilitates reaction of the hydrogen bond cleaving agent 102 with the delaminated cellulose, which results in formation of dissolved cellulose feed stock 110.

Again, the most preferred soda cellulose Q conditions for wood pulp cellulose were found to be a sodium hydroxide concentration of 9 percent by weight and a temperature between −7° C. and 2° C.

As indicated by the optional process lines 107 and 109 in FIG. 2, rather than subjecting the cellulose to a single pass through a cavitator 44 (the cavitator 44 may, itself, of course, have plural cavitation stages to increase throughput), the cellulose and solvent slurry may be recirculated through the cavitator. Although this approach reduces the degree of polymerization of the resulting feed stock, the cavitator causes a mixing of the cellulose and solvent in the slurry and enhances the dissolution of the cellulose. Also, with this modification the dewaterer 92 and mixer 108 is typically eliminated. However, as indicated by line 111, recirculation can also be accomplished after mixing.

In both the single stage and two stage process, there is the alternate option of using cellulose fiber directly from a pulp manufacturing process. This option will be more cost efficient from the standpoint of eliminating the additional costs involved in drying the pulp and shipping to the cellulose production site. This option also eliminates the costs involved in rehydrating the dried pulp with a hydropulper. Also, the drying of pulp promotes hydrogen bonding between the cellulose molecules in the fiber. Therefore, it takes less energy to dissolve the cellulose with the pulp directly from the manufacturing process option than it would with hydropulping the dry pulp.

Cavitation of the pulp slurry by pumping the slurry through a cavitator is an important component of the present invention, whether such cavitation occurs before or after the cellulose is exposed to a hydrogen bond cleaving agent. Again, during cavitation the fiber layers are peeled back lengthwise, minimizing the tearing of the cellulose structure, allowing a higher degree of polymerization to be achieved. The peeling back of the fiber layers also allows the hydrogen bond cleaving agent a greater surface area to react and dissolve the cellulose fiber. This peeling back occurs whether the cellulose is treated with a solvent before, after, or during cavitation.

In a pre-cavitation treatment with solvent (e.g. NaOH) approach, the degree of polymerization of the finished product is harder to control and usually lower than in the process where cavitation is first performed followed by subjecting the slurry to a solvent. For example, the degree of polymerization of the cellulose dope is typically in the range from 200–400 when the cellulose in solvent is subjected to cavitation, and about 400–600 or higher when cavitation is applied prior to subjecting the material to the solvent. This difference is believed due to hydrodynamic forces caused by cavitation which not only peel back the fiber layers, but also cause scission in the cellulose molecules already in solution when the material in solvent is being subjected to cavitation. The scission is believed caused both by shear forces caused by microstreaming or by friction generated by relative movement of solvent and polymer molecules. This scission results in a lower degree of polymerization.

In the successive approach of cavitating the slurry first, followed by treatment with a solvent, the degree of polymerization tends to be higher and easier to control. In this latter approach, optimum conditions for cavitation may be set independently of the optimum conditions for effective dissolution. Also, because cavitation is applied to the material prior to inclusion in a solvent, the cavitation will not cleave the polymer molecules because the cellulose molecules have not been dissolved out of the cellulose fiber structure. This results in a higher degree of polymerization of the final product.

Figure 3:
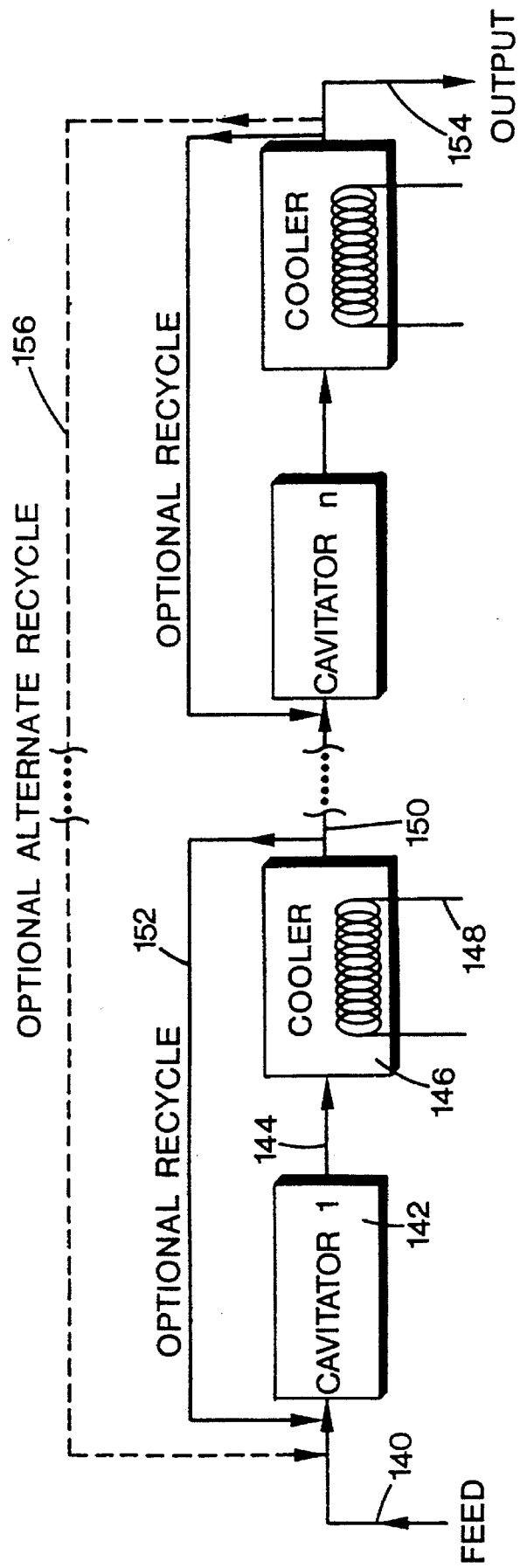
FIG. 3 is a block diagram of a series cavitation system.

Several cavitation systems may be used in practicing the process of the present invention, in addition to those shown in FIGS. 1 and 2. For example, a series cavitation system is illustrated in FIG. 3. In this case, a pulp slurry 140 is pumped into the first cavitator 142 (like cavitator 44) at appropriate solvent conditions, such as soda cellulose Q conditions, to produce a cavitated pulp slurry 144. The physical process of cavitation causes an increase in the slurry temperature. Therefore, the cavitated pulp slurry 144 may be pumped into a cooler 146 where the cooling element 148 reduces the temperature to the desired magnitude, such as to the temperature at soda cellulose Q condition. This reduction in temperature maintains the vapor pressure for a subsequent recirculation through the cavitator. The cooled pulp slurry 150 is either pumped to one or more downstream cavitators and coolers, or part is recycled in a stream 152 to the cavitator 150, or both. The amount of recycle is dependent on the treatment time that the slurry requires to achieve efficient peeling of the pulp fibers. The pulp in this example is passed through successive cavitators and coolers to result in output stream 154.

Another optional recycle can be done by recycling a portion of the output stream 154 to an optional alternate recycle stream 156. The recycle stream 156 may be combined with the initial pulp slurry 140.

Figure 4:
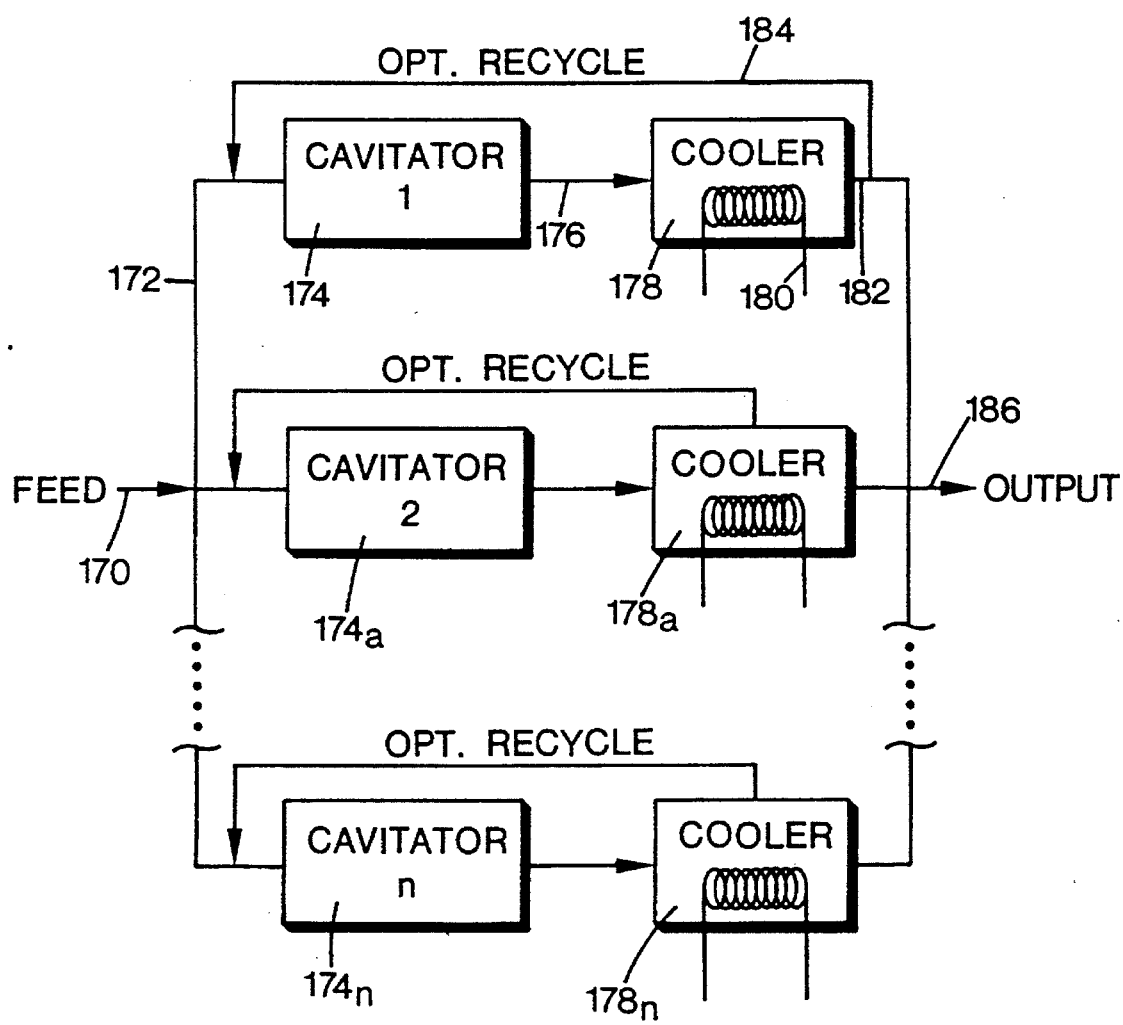
FIG. 4 is a block diagram of a parallel cavitation system.

An alternative parallel cavitation system is shown in FIG. 4. The resulting product will be the same as the series cavitation system, but the FIG. 4 process allows for greater control of the process. For example, each individual cavitator may be monitored and adjusted independently of the other cavitators in order to achieve an output of the same quality as the other cavitators. The pulp slurry 170 is split into a plurality of parallel streams and pumped into a plurality of pairs of cavitators (174, 174a, 174n) and coolers (178, 178a, 178n). A split stream 172 is pumped to first cavitator 174 resulting in cavitated pulp slurry 176. As in the series cavitation system illustrated in FIG. 3, vapor pressure is maintained in the present parallel system by cooling element 180. If the optional recycle is used, the cooled pulp slurry 182 is either pumped to the output stream 186 or part is optionally recycled in recycle stream 184 and combined with the initial split stream 172.

Figure 5:
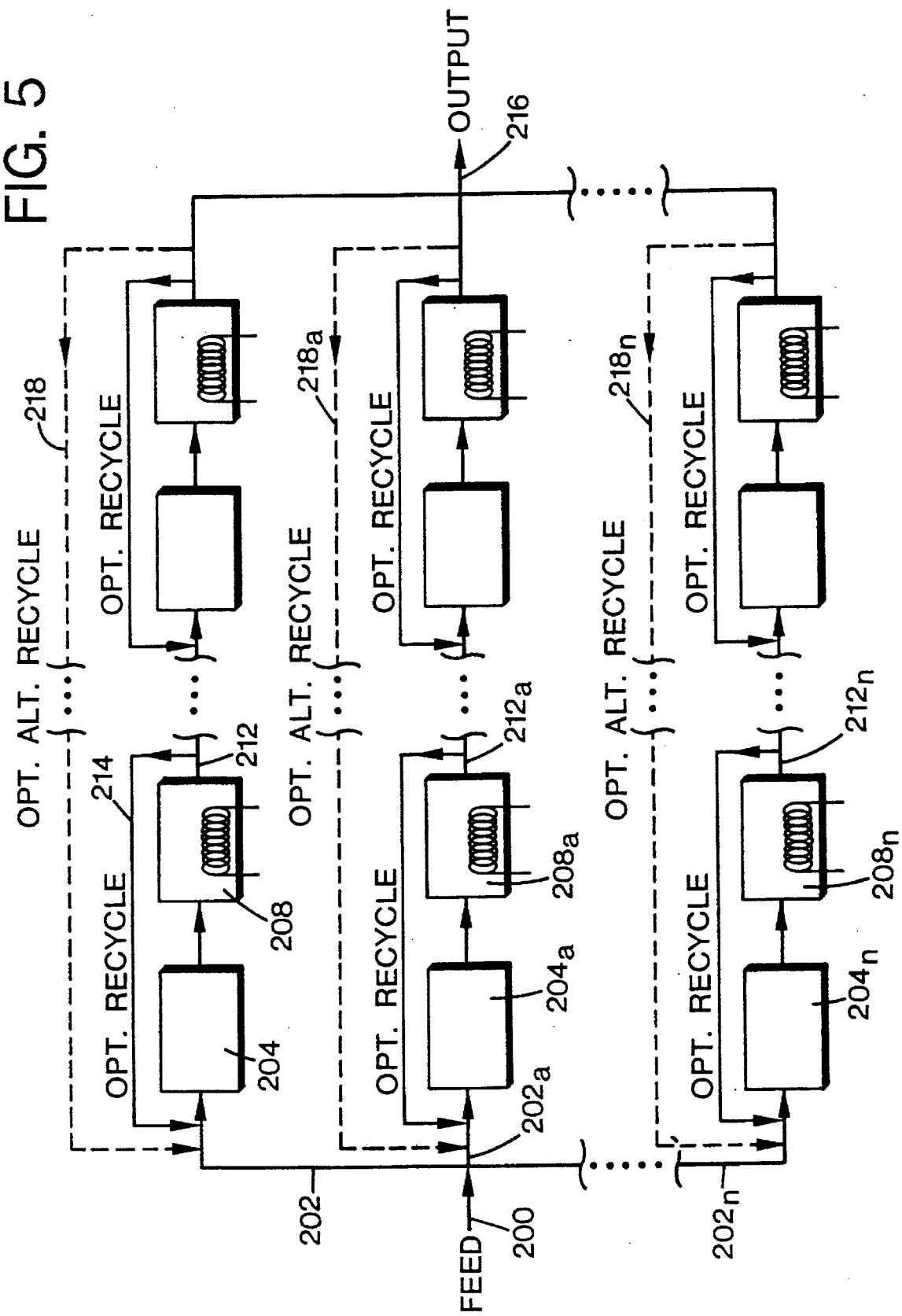
FIG. 5 is a block diagram of a combination series and parallel cavitation system.

The series cavitation system of FIG. 3 and the parallel cavitation system of FIG. 4 may also be combined, as illustrated in FIG. 5. The combination of the two systems will achieve a median between controllability and amount of recycle. The pulp slurry 200 is split into a plurality of parallel streams (e.g. 202, 202a, 202n) and pumped into a plurality of cavitator and cooler sets in series. Any number of parallel streams may be used with n streams being illustrated in FIG. 5. The split slurry streams 202, 202a, and 202n are pumped into respective stages, each including a cavitator and cooler. For example, the illustrated first stage cavitators include cavitators 204, 204a and 204n, wherein cavitation occurs. Vapor pressure is maintained in the first stage by coolers 208, 208a and 208n. The cooled pulp slurry from the first stage is either pumped to one or more subsequent stages of cavitators and coolers (see lines 212, 212a, 212n), or part is optionally recycled in a recycle stream (see lines 214, 214a, 214n). The pulp in each parallel stream is passed through any number of sets of successive cavitators and coolers to result in output stream 216. Another optional recycle can be done by recycling part of the output stream 216 to an optional alternate recycle stream 218. The recycle stream 218 is combined with the initial split slurry 202.

The cellulose slurry can also be pressurized prior to cavitation. The pressurization results in an increase in the energy which must be applied to the slurry solution to cause cavitation, and correspondingly results in a greater release of energy by bubbles collapsing during cavitation. This greater release of energy results in higher forces impacting the cellulose fibers during cavitation, which results in more efficient fibrillization of the fibers. For example, the slurry may be placed in a pressurized vessel in which cavitation takes place, with a typical pressure being from slightly above one ATM to about five ATM. In general, Pv (the vapor pressure of a bubble in the slurry) must be greater than the difference between Ph (the applied hydrostatic pressure) and Pa (the pressure of the applied pulsed energy) for cavitation to occur. Therefore, selection of the applied pressure depends upon factors such as the equipment being used, the solvent being used, the temperature, and the available pulsed energy.

Although the invention is not limited to specific examples, several examples are described below to further illustrate the invention.

EXAMPLE I

An experiment 1 was conducted using a single stage process as illustrated in FIG. 1. VC-78 dissolving grade sulfite pulp, Weyerhaeuser Company, a softwood pulp, was slurried in soda cellulose Q condition with a slurry concentration of 2 percent by weight cellulose to the total weight of the slurry, an initial degree of polymerization of about 840, a constant temperature of −4° C., and total cellulose weight of 20 grams, was subjected to cavitation using a Sonics and Materials Incorporated (of Danbury, Conn.) Ultrasonic Processor Model VC-1500 at 20 kHz with NaOH concentration varying at 7 percent, 8 percent, and 9 percent, and the time of cavitation varying at 120 minutes, 180 minutes, and 240 minutes. The optimum results occurred at 8 percent NaOH concentration, a treatment time of 180 minutes. At those conditions, 94.3 percent of the cellulose dissolved with a degree of polymerization of 280. The experimental range of percent dissolved was between 72.96 percent and 94.3 percent. The experimental range of resulting degree of polymerization was between 220 and 310. This experiment showed that the percent of dissolution and the degree of polymerization remained consistently high, while the slurry was maintained in or near soda cellulose Q conditions. Under these conditions, Cellulose I (natural cellulose) easily went into solution, that is, at least about 70 percent of the cellulose in the slurry went into solution. More specifically, a substantial majority of at least 90 percent can be dissolved readily using the method of the present invention. This same approach was applied to other types of cellulose pulp subjected to a 9 percent w/w NaOH concentration, cavitation for 240 minutes at a temperature of 2° C., with the results being set forth in Table I, below.

TABLE I

| Pulp | Initial DP | Percent Dissolution | Solution DP |
|---|---|---|---|
| A | 1,250 | 90 | 240 |
| B | 1,177 | 82 | 260 |
| C | 1,418 | 77* | 240 |
| D | 1,110 | 82 | 220 |
| E | 930 | 80–90 (est.) | 390 |

A T-583 - Bleached sulfite (acetate grade) hemlock from Weyerhaeuser Company, Cosmopolis pulp plant.
B Bleached kraft hardwood (aspen) from Weyerhaeuser Company, Prince Albert pulp plant.
C Bleached kraft softwood (spruce-J.pine) from Weyerhaeuser, Prince Albert pulp plant.
D Regular bleached kraft Douglas fir (100 percent) from Weyerhaeuser Company, Everett pulp plant.
E Bleached sulfite-eucalyptus from Courtaulds Corporation of Coventry, England.
*3.5 hour treatment, sonolator pitted due to cavitation.

This table demonstrates the applicability of the process of the present invention to the dissolution of wide varieties of cellulose starting materials, including non-dissolving grades of wood pulp. Cellulose having the crystal form of Cellulose II, III or IV (regenerated cellulose) can also be dissolved into solution with this process. However, cavitation is typically less important and may not be necessary when dealing with cellulose other than Cellulose I.

EXAMPLE II

In this example, performed utilizing the single stage process as illustrated in FIG. 1, the pulp of Example I was slurried at a concentration of 2 percent by weight. This pulp also had an initial degree of polymerization of about 840. In this case, 20 gram samples of cellulose were subjected to cavitation for 180 minutes using the same sonolator as in Example I operated at 20 kHz. These samples were placed in caustic NaOH at concentrations varying from 6 percent, 9 percent, and 12 percent by weight/weight of slurry and at temperatures varying from −6° C. 2° C. and 10° C. Each emulation of these temperatures and concentrations were tested to obtain results at conditions within and outside of soda cellulose Q conditions. The range of the percent of dissolved cellulose was between 6.5 percent and 100.0 percent depending upon the conditions. The resulting degree of polymerization of the dissolved cellulose ranged from 195 to 330. The best results occurred at 9 percent NaOH concentration and a temperature of 2° C. which yielded 95 percent dissolution and a degree of polymerization of 280; and at 9 percent NaOH concentration and a temperature of −4° C. which yielded 100 percent dissolution and a degree of polymerization of 195. Both of these results were at the boundary of soda cellulose Q conditions. Therefore, a lower quantity of dissolved cellulose was generally achieved as the slurry was treated further from soda cellulose Q conditions. These results are set forth in Table II.

TABLE II

| Run | Caustic Conc. (Wt. %) | Temperature (°C.) | Percent Dissolved | Solution DP |
|---|---|---|---|---|
| 1 | 9 | 2 | 95.0 | 280 |
| 2 | 12 | 2 | 6.5 | 220 |
| 3 | 6 | 2 | 32.2 | 230 |
| 4 | 6 | 10 | 16.8 | 240 |
| 5 | 9 | −4 | 100.0 | 195 |
| 6 | 9 | 10 | 67.8 | 200 |
| 7 | 6 | −4 | 62.5 | 290 |
| 8 | 12 | −4 | 34.2 | 330 |
| 9 | 12 | 10 | 67.1 | 230 |

EXAMPLE III

This example relates to the two stage process as illustrated in FIG. 2. The same pulp as used in Example I was mixed into a cellulose slurry with a concentration of 2 percent by weight. This cellulose had an initial degree of polymerization of 840 and was subjected to cavitation for 12 minutes/gram using the same sonolator as in Example I operated at 20 kHz. The cavitated slurry was subsequently taken to soda cellulose Q conditions with a NaOH concentration of 7.5 percent by weight and the temperature about at 0° C., and mixed using a high shear Henschel mixer at 640 rpm. This example resulted in from about 86 to about 100 percent dissolution of the cellulose with a degree of polymerization of the cellulose in solution of about 640. This example demonstrated that a very high degree of polymerization and a high percentage of dissolution can be achieved with a two stage process.

While the present invention has been described in accordance with preferred embodiments, it is to be understood that certain substitutions, variations and changes may be made thereto without departing from the invention as set forth in the claims. I claim all such changes as fall within the scope of the following claims:

What is claimed is:

1. A method for the preparation of a cellulose dope for use in regeneration of cellulose comprising:

subjecting a cellulose slurry that includes underivatized cellulose I to cavitation to expose the cellulose, including the underivatized cellulose I, to dissolution; and, combining the cellulose slurry with a cellulose solvent.

2. A method according to claim 1 wherein the cellulose slurry is subjected to cavitation with the cellulose solvent in the slurry.

3. A method according to claim 2 wherein the cellulose slurry is approximately soda cellulose Q condition.

4. A method according to claim 3 wherein the cellulose slurry is near soda cellulose Q condition by bringing the mixture to a temperature between −7° C. and 4° C., with a NaOH concentration of 6 percent to 10 percent by weight.

5. A method according to claim 1 wherein the cellulose slurry is subject to cavitation a plurality of times.

6. A method according to claim 1 wherein the cellulose slurry is pressurized above ambient pressure prior to cavitation.

7. A method according to claim 1 wherein the cellulose slurry subjected to cavitation is pressurized.

8. A method according to claim 1 wherein a cooling means is used to maintain a vapor pressure for effective cavitation of the cellulose slurry.

9. A method according to claim 1 wherein the cellulose slurry contains at least 1.5 percent cellulose by weight.

10. A method according to claim 1 wherein cavitation is induced by a sonic means.

11. A method according to claim 10 wherein cavitation is achieved by applying pulsed energy at a frequency from about 500 Hz to about 1 Mhz.

12. A method according to claim 10 wherein a sonic treatment rate on the cellulose slurry is at least 8 minutes per gram.

13. A method according to claim 1 wherein the cellulose slurry is placed in the cellulose solvent subsequent to subjecting the cellulose slurry to cavitation.

14. A method according to claim 13 wherein the cellulose slurry is placed in a cellulose solvent which is approximately at soda cellulose Q condition.

15. A method according to claim 13 wherein the cellulose slurry is placed in a cellulose solvent which is at a temperature between −7° C. and 4° C. and which has a NaOH concentration of 6 percent to 10 percent by weight.

16. A method according to claim 15 wherein a cooling means is used to maintain the temperature for the soda cellulose Q condition.

17. A method according to claim 1 which includes a step of diverting cellulose directly from a pulp manufacturing line to form the cellulose slurry.

18. A method for the preparation of a cellulose dope for use in regeneration of cellulose comprising:

cavitating a cellulose slurry that includes underivatized cellulose I and having at least 1.5 percent by weight cellulose a plurality of times to expose cellulose in the slurry to dissolution, including the underivatized cellulose I, and to yield a treatment rate of at least about 8 minutes per gram, with a cooling means to maintain a vapor pressure for effective cavitation;

bringing the cellulose slurry to soda cellulose Q condition, either prior to or subsequent to cavitation, by maintaining the slurry at a temperature of −7° C. to 4° C., and adding NaOH to a concentration of 6 percent to 10 percent by weight.

19. A method for preparing a cellulose dope, comprising:

forming an aqueous cellulosic slurry that includes underivatized cellulose I, the cellulose I having a degree of polymerization of at least 400;

pressurizing the slurry to a pressure of greater than about 1 atmosphere to about 5 atmospheres;

cavitating the cellulose slurry using an electronic sonicator operating at a frequency of from about 500 Hz to about 1 MHz to expose the cellulose, including the underivatized cellulose I, to dissolution;

adding to the cellulose slurry a cellulose solvent selected from the group consisting of sodium hydroxide, potassium hydroxide, lithium hydroxide, beryllium hydroxide, cesium hydroxide, and combinations thereof, the solvent having a concentration of from about 6 percent to abut 10 percent by weight of the slurry; and cooling the slurry to a temperature of from about −7° C. to about 4° C.

* * * * *